(12) United States Patent
Hoffmann et al.

(10) Patent No.: US 6,357,955 B1
(45) Date of Patent: Mar. 19, 2002

(54) SELF RETAINING CLEVIS PIN AND CLEVIS ASSEMBLY

(75) Inventors: Arthur W Hoffmann, St. Clair Shores; Bruce A Hiemstra, Ann Arbor, both of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/488,956

(22) Filed: Jan. 21, 2000

(51) Int. Cl.7 ................................................ F16D 1/12
(52) U.S. Cl. ........................ 403/79; 411/510; 403/150; 403/408.1
(58) Field of Search ................................ 411/510, 399; 403/78, 79, 150, 154, 153, 157, 408.1

(56) References Cited

U.S. PATENT DOCUMENTS

| 3,456,972 A | * | 7/1969 | Drotar ...................... 403/408.1 |
| 3,687,501 A | * | 8/1972 | Wilson et al. ............ 403/408.1 |
| 4,396,329 A |   | 8/1983 | Wollar |
| 4,682,687 A |   | 7/1987 | Leege et al. |
| 4,722,628 A | * | 2/1988 | Rager ........................... 411/510 |
| 5,092,118 A |   | 3/1992 | VanDeMark |
| 5,306,098 A |   | 4/1994 | Lewis |
| 5,461,852 A |   | 10/1995 | Nagamatsu |
| 5,979,954 A | * | 11/1999 | Tsui et al. ..................... 403/78 |

FOREIGN PATENT DOCUMENTS

| GB | 2058990 | * | 4/1981 | .................. 411/386 |
| JP | 2278005 | * | 11/1990 | .................. 411/399 |

* cited by examiner

*Primary Examiner*—Lynne H. Browne
*Assistant Examiner*—Aaron M Dunwoody
(74) *Attorney, Agent, or Firm*—Foley & Lardner

(57) ABSTRACT

A self retaining elongated pin for use in a polymer clevis is disclosed. The pin has a generally cylindrical shaft diameter with an enlarged head at one end. Knurling is provided on either the shaft or head to resist axial rotation of the pin. Axial translation of the pin is restrained by the head in the direction toward the head and by fetters in the direction away from the head. The fetters engage the clevis in an interference fit. The fetters are angulated such that the fetter tip is directed toward the head to preferentially favor insertion and resist removal.

24 Claims, 3 Drawing Sheets

SELF RETAINING CLEVIS PIN AND CLEVIS ASSEMBLY

TECHNICAL FIELD OF THE INVENTION

This invention generally relates to a mechanical linkage assembly. More specifically, this invention relates to a self retaining clevis pin which requires no additional retention hardware or installation operations after being pressed into the clevis. The device is adapted for use as a component of an automotive power seat mechanism.

BACKGROUND

Clevis assemblies are a common mechanical linkage to transmit force and allow pivotal motion between two mechanical members. A typical clevis assembly includes a clevis member having a pair of spaced apart clevis arms with a pin extending between the arms for attachment of a connecting lug between the arms. The arms and lug are commonly drilled with clearance through holes to receive the pin. The cylindrical pin is typically retained by an enlarged head at one end and a mechanical fastener at the other end. Mechanical fasteners such as cotter pins, resilient clips, or threaded nuts are commonly used in the art. U.S. Pat. Nos. 5,286,130, 4,113,397, and 4,932,807, for example, disclose these types of mechanical fasteners and techniques previously known in the art.

Cotter pins, resilient clips, and threaded nuts all require an additional assembly operation beyond inserting the pin in the clevis assembly to secure the pin. In each case the assembly operation requires alignment of the fastener with the pin which can be difficult to achieve, particularly in an automated assembly.

When utilizing a cotter pin, the cotter pin must be inserted in a cross-hole through the clevis pin and the ears extending beyond the clevis pin shaft are then bent to retain the cotter pin.

Resilient fasteners, commonly referred to as e-clips or circlips, require alignment of the clip with an annular groove machined in the clevis pin prior to insertion, which typically requires a special tool. Resilient clips are particularly prone to being plastically deformed and therefore non-functional or springing away if not correctly installed. Incorrect installation can result in clips which fall off or are left within the product possibly causing damage and customer dissatisfaction.

Threaded nuts require costly threading of the clevis pin and are complex to mechanically assemble due to the potential for cross-threading. Since high volume product assembly continues to move toward automation and a reduced number of parts in the assembly is desirable wherever possible, current techniques for securing clevis pins with separate fasteners do not fully optimize the assemblies because the assemblies continue to require additional parts and complex assembly techniques.

One approach to a self retaining pin is taught in U.S. Pat. No. 4,682,687 where a pintle chain is shown with polymer links and a plurality of pins connecting the links. The '687 patent shows a headless pin with a D-shaped noncircular first end to resist axial rotation when properly aligned and inserted within a corresponding D-shaped hole in the link. Diamond or annular shaped knurling on the second end restrains axial translation. One disadvantage of a self retaining pin which depends on a noncircular shape to resist rotation is that a corresponding noncircular hole must be formed in the mating part. An even more important disadvantage is that the noncircular feature must be properly oriented for assembly which may take additional time and effort for hand assembly and make automated assembly difficult or costly. The diamond or annular shape knurling of the pintle chain pin may be adequate for axial retention of the pin under cyclic tensile loading as found in a chain but could prove inadequate under more complex loading or sequences of loading if used in a clevis application. The present invention provides more positive axial retention and lower insertion forces, for a given interference fit, than diamond or annular knurling due to the angulation of the projections called "fetters" toward the head allowing easy insertion and difficult extraction in a manner analogous to the action of a barb on a fish hook.

The present invention is used in an automotive power seat mechanism. Motive power is provided by a motor and leadscrew to a polymer nut. Integral with the nut is a clevis member having a pair of spaced apart clevis arms with the pin of the present invention extending between the arms for attachment of the seat linkage system.

Unrelated to the general background of clevis pin retention, but of interest to the background of the fetters in the present invention are "Christmas tree" fasteners. These fasteners are typically made of plastic and used for attachment of components to sheet metal. Typically a Christmas tree fastener takes the form of a headed pin with a series of angled disks extending laterally along the longitudinal axis of the pin shaft. The disks are angled back toward the pin head to create a directional bias favoring insertion and resisting retraction. When pushed into holes through layers of material, the disks elastically deflect inward while passing through the hole and return to an open position when completely through the holes thereby resisting retraction of the fastener and attaching the layers of material to one another.

SUMMARY OF THE INVENTION

The present invention provides a self retaining pin for a clevis assembly which overcomes the problems and disadvantages of the conventional techniques in the art. The invention also provides a self retaining pin which requires no additional retention hardware or installation operations after being pressed into the clevis.

Briefly, the present invention includes a self retaining elongated pin for use in a clevis. The clevis is fabricated from a material softer than the pin material, such as a polymer material. The pin has a generally cylindrical shaft having one or more shaft diameters with an enlarged head at one end and a generally tapered or radiused end at the other. Knurling is provided on either the shaft or the head to resist axial rotation of the pin. Axial translation of the pin is restrained by the head in a first direction and by the fetters in the opposite direction. The fetters are substantially radially symmetrical features with each fetter having a root and a tip with corresponding root diameter and tip diameter. In the preferred embodiment, the fetter tip diameter is larger than the shaft diameter and is smaller than the head diameter. The fetters, particularly the fetter tips, engage the clevis in an interference fit. The fetters are angled such that the fetter tip is directed toward the head to preferentially favor insertion and resist removal of the pin.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments are merely exemplary in nature, and are in no way intended to limit the invention, or its application, or uses.

Figure 1:
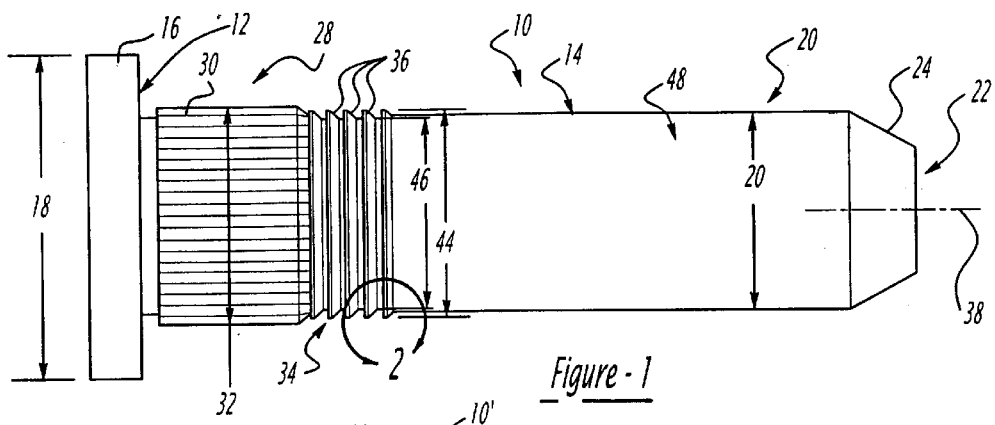
FIG. 1 is a side view of a self retaining clevis pin made in accordance with a first preferred embodiment of the present invention.

FIG. 1 shows the first; preferred embodiment of a self retaining clevis pin 10. At a first end 12 of the elongated, cylindrical shaft 14 is a cylindrical head 16 with a head diameter 18 which is larger than the shaft diameter 20. At the second end 22 of the shaft 14 is a bevel 24, facilitating initial insertion of the pin 10 into a clevis 26, as shown in FIG. 8.

Proximate to the head 16 is an anti-rotation first region 28 of the shaft 10 with straight knurling 30. While straight knurling is described in the preferred embodiment, other formations or patterns which resist rotation such as diamond, angled, helical or crossed helical knurling are suitable for resisting rotation. The knurling 30 of the first region 28 has a major diameter 32 which is larger than the shaft diameter 20. Proximate to the first region 28 on the side toward the second end 22 is an axial retention second region 34 of the shaft 10 in which is located a number of fetters 36.

Figure 2:
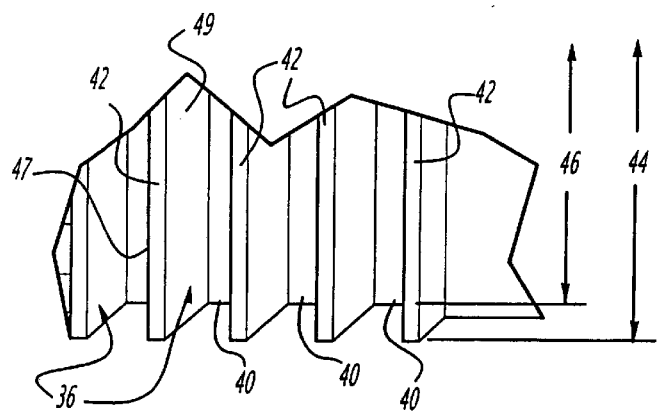
FIG. 2 is a enlarged view of the fetter region of the self retaining clevis pin shown in FIG. 1.

With additional reference to FIG. 2, the fetters 36 of the second region 34 are generally symmetrical about the longitudinal axis 38 of pin 10, each fetter 36 having a root 40 and a tip 42 with a corresponding tip diameter 44 and a root diameter 46. The fetter tip diameter 44 is larger than the shaft diameter 20 and is smaller than the head diameter 18. The fetters 36, particularly the fetter tips 42, engage the clevis 26 in an interference fit when inserted in the bores, 50 and 51, as described below. The fetters 36 have an angular bias such that the fetter tip 42 is directed toward the head 16 and away from the second shaft end 22. Thus, for each fetter 36 the surface 47 between the tip 42 and the root 40 on the side toward the head 16 is substantially perpendicular to the shaft, while the surface 49 toward the second shaft end 22 is angled toward the head 16.

Figure 7:
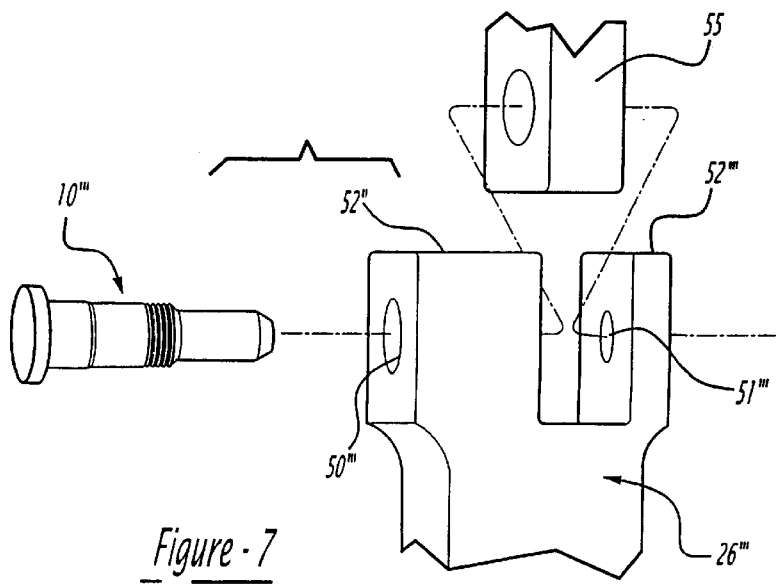
FIG. 7 is an exploded perspective view of a clevis and self retaining clevis pin assembly made in accordance with the clevis pin shown in FIG. 6.
Figure 8:
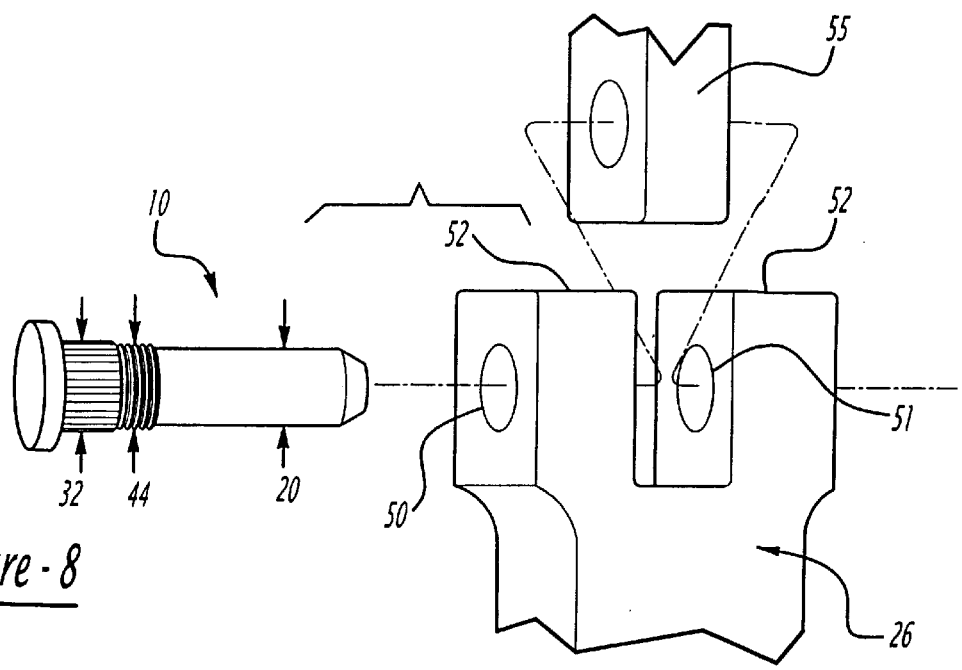
FIG. 8 is a perspective view of a clevis for use with the self retaining clevis pins shown in FIGS. 1 and 3.

Proximate to the second region 34 on the side toward the second end 22 is a generally cylindrical third region 48 of the shaft 14 which serves as a pivot for a clevis connecting lug 55, as shown in FIGS. 7 and 8, and also mates with the corresponding bores 50 and 51 in the clevis 26, as shown in FIG. 8.

In use the first preferred embodiment shown in FIG. 1 is inserted axially into the bore 50 which is drilled through each clevis arm 52 of the clevis 26 shown in FIG. 8. The bore 50 is of a diameter which provides a clearance fit for the shaft diameter 20 and an interference fit for the fetter tip diameter 44 and the knurling major diameter 32. The insertion bevel 24 serves to guide the pin 10 into the bore. When the fetters 36 begin to engage in the bore 50, greater insertion pressure is applied to the pin 10 to force the fetters 36 and knurling 30 into the bore until the head 16 contacts the clevis arm 52 and stops the insertion movement. Both the fetters 36 and the knurling 30 are engaged in an interference fit with the clevis 26 and provide axial retention and prevent axial rotation, respectively. The clevis 26 is fabricated from a material softer than the pin material, such as a polymer material to allow the bore 50 to conform to and better engage the fetters 36.

During the course of experimentation, it was found that in the act of press fitting either the fetters 36 or the knurling 30, the first of these features to enter the clevis bore 50 tends to plastically enlarge the bore 50 since the clevis 26 is fabricated from a material softer than the pin material. The enlargement of the bore 50 decreases the effectiveness of the second feature when the second feature has the same outside diameter as the first feature. Therefore, in the first preferred embodiment, the knurling major diameter 32 is larger than the fetter tip diameter 44. Consequently the knurling major diameter 32 and the fetter tip diameter 44 each achieve the desired interference fit with the clevis 26 and prevent, respectively, axial rotation and axial translation of the pin 10.

Thus, when fully inserted into the clevis 26, the pin 10 is completely captured and self retaining. The pin 10 cannot rotate due to the press fit of the knurling 30 against the clevis bore 50. The pin 10 cannot translate in the direction of the second shaft end 22 because further travel is restricted by the head 16, and it cannot back out in the direction of the first shaft end 12 due to the barb-like interference engagement of the clevis bore 50 by the fetters 36.

Figure 3:
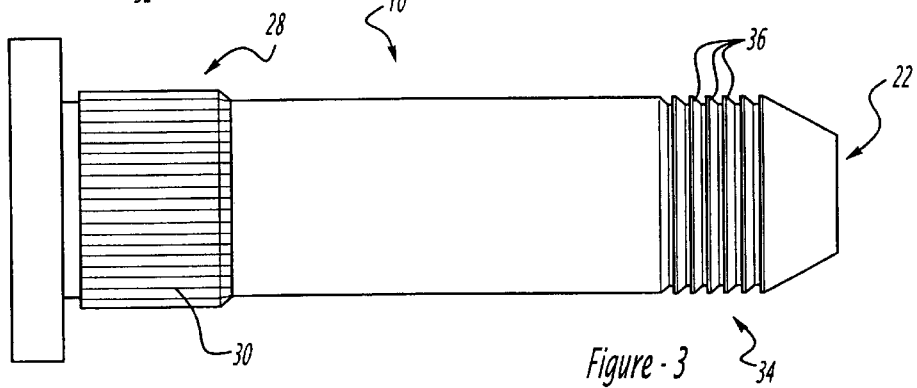
FIG. 3 is a side view of a self retaining clevis pin according to a second preferred embodiment of the present invention.

FIG. 3 shows a second embodiment of the self retaining clevis pin 10'. In the present embodiment the axial retention region 34, including fetters 36, is located proximate to the second shaft end 22. The present arrangement allows engagement of the knurling 30 with a first arm 52 of the clevis 26 and the fetters 36 with a second arm 52 of the clevis 26. The use of both arms 52 enables an increased length of the anti-rotation and axial retention regions, 28 and 34, allowing a greater length of knurling 30 and additional fetters 36 to increase the rotation or translation resistance of the pin 10'. Alternatively, narrower clevis arms 52 can be utilized while still providing sufficient rotational or translational resistance.

Figure 4:
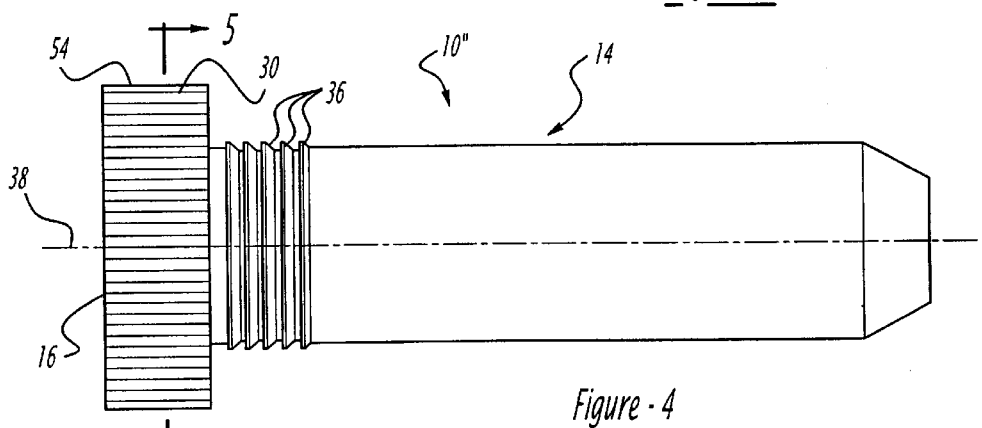
FIG. 4 is a side view of a self retaining clevis pin according to a third preferred embodiment of the present invention.
Figure 5:
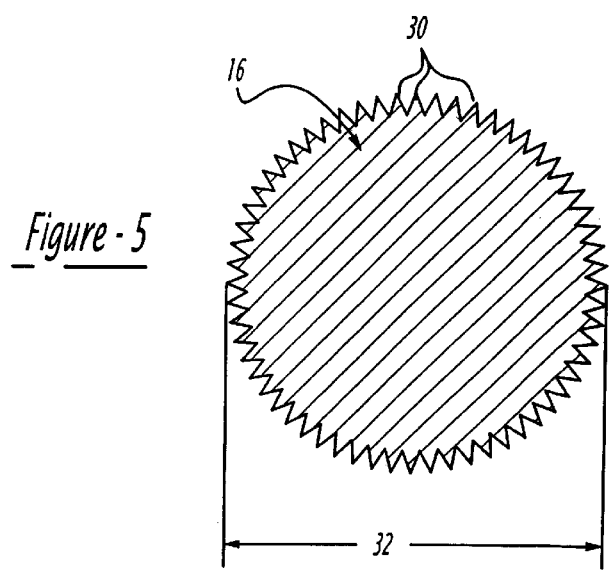
FIG. 5 is a sectional view, taken along line 5—5 in FIG. 4 of a knurled head of the self retaining clevis pin made in accordance with the teachings of the present invention.
Figure 9:
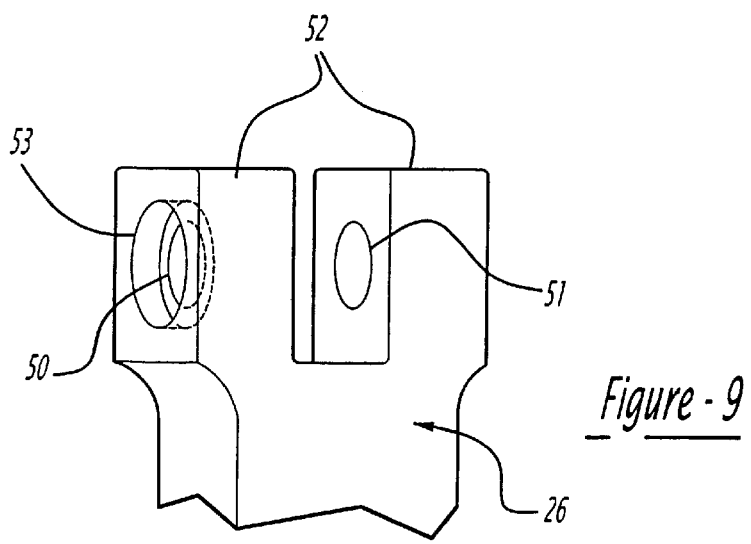
FIG. 9 is a perspective view of a clevis for use with the self retaining clevis pin shown in FIG. 4.

FIGS. 4 and 5 show a third embodiment of the self retaining clevis pin 10". The present embodiment replaces the anti-rotation region 28 on the shaft 14, as disclosed in the prior embodiments, with knurling 30 on the radially outward edge 54 of the head 16 which is mated with an appropriate counterbore 53 in the clevis arm 52, as shown in FIG. 9. Since the knurling 30 on the head 16 acts at a greater radius from axis 38 than the knurling on the shaft 14, greater rotation resistance can be provided for a given length of knurling 30 which engages clevis 26. Furthermore, when a recessed head 16 is desired a counterbore is required in the clevis 26. A counterbored clevis 26 may not leave sufficient length of the bore 50 remaining in the clevis arm 52 for satisfactory engagement of the knurling 30 and fetters 36 if both features are located on the shaft 14.

Figure 6:
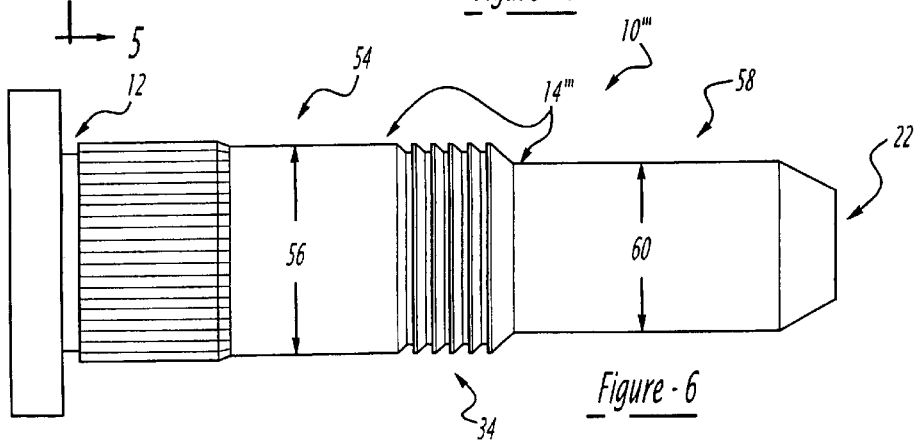
FIG. 6 is a side view of a self retaining clevis pin according to a fourth preferred embodiment of the present invention.

FIGS. 6 and 7 show a fourth embodiment of the self retaining clevis pin 10'''. In the present embodiment the axial retention region 34 is located at an intermediate position along the shaft 14''' between the first and second ends, 12 and 22. Furthermore the shaft 14''' is stepped to provide a generally cylindrical fourth region 54 having a larger first shaft diameter 56 at the first end 12 and a generally cylindrical fifth region 58 having a smaller second shaft diameter 60 at the second end 22. The present embodiment requires a larger size bore 50''' in one arm 52'' of clevis 26''' and a smaller diameter bore 51''' in the other arm 52''' of the clevis 26'''. The bores, 50''' and 51''', correspond to the shaft diameters, 56 and 60, respectively.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A self retaining clevis pin for engagement with the bore of a clevis, said self retaining clevis pin comprising:
   a generally cylindrical shaft having a first end and a second end, said shaft having a shaft diameter;
   a head having a head diameter greater than said shaft diameter and being located at said first end of said shaft;
   an axial anti-rotation portion defined by said clevis pin, said anti-rotation portion operable to substantially resist rotation of said clevis pin and including knurling extending in a direction generally parallel to the axis of the shaft; and
   an axial retention portion defined by said clevis pin, said axial retention portion operable to substantially retain said clevis pin within said clevis bore and including fetters completely surrounding the shaft.

2. The pin of claim 1 wherein each fetter has a root and a tip with a corresponding root diameter and a tip diameter, said fetter tip diameter being larger than the smallest of said shaft diameters and smaller than said head diameter, whereby said fetters are capable of engaging the clevis bore in an interference fit and have an angular bias such that each fetter tip is offset toward said head relative to each fetter root to preferentially favor insertion and resist removal of said clevis pin.

3. The pin of claim 2 wherein said fetters are proximate to said first end.

4. The pin of claim 2 wherein said fetters are proximate to said second end.

5. The pin of claim 2 wherein a first set of fetters is proximate to said first end and a second set of fetters is proximate to said second end.

6. The pin of claim 5 wherein said tip diameter of said second set of fetters is equal to or smaller than said tip diameter of said first set of fetters.

7. The pin of claim 1 wherein said knurling has a major diameter.

8. The pin of claim 7 wherein one of said knurling major diameter and said fetter tip diameter being a smaller diameter, wherein said one diameter is nearer said second shaft end.

9. The pin of claim 1 wherein said anti-rotation portion includes knurling on said head of said pin.

10. The pin of claim 1 having two or more shaft diameters, a largest diameter being proximate to said first end and a smallest diameter being proximate to said second end.

11. A clevis and self retaining clevis pin assembly comprising:
   a clevis having a bore and two or more clevis arms;
   a clevis pin having a first end and a second end with a generally cylindrical shaft having a shaft diameter;
   said clevis pin having a head, said head having a head diameter greater than said shaft diameter and being located at said first end of said shaft;
   said clevis pin having an axial anti-rotation portion defined by said clevis pin, said anti-rotation portion operable to substantially resist rotation of said clevis pin and including knurling extending in a direction generally parallel to the axis of the shaft; and
   said shaft having an axial retention portion defined by said clevis pin, said axial retention portion operable to substantially retain said clevis pin within said clevis bore and including fetters completely surrounding the shaft.

12. The clevis and self retaining pin assembly of claim 11 wherein each fetter has a root and a tip with a corresponding root diameter and a tip diameter, said fetter tip diameter being larger than a smallest of said shaft diameters and smaller than said head diameter, whereby said fetters are capable of engaging the clevis bore in an interference fit and have an angular bias such that each fetter tip is offset toward said head relative to each fetter root to preferentially favor insertion and resist removal of said clevis pin.

13. The clevis and self retaining pin assembly of claim 11 wherein said pin is made of a harder material than said clievis.

14. The clevis and self retaining pin assembly of claim 11 wherein said clevis is made of a polymer.

15. The clevis and self retaining pin assembly of claim 11 wherein said pin is made of a metal.

16. The clevis and self retaining pin assembly of claim 11 wherein said knurling has a major diameter.

17. The clevis and self retaining pin assembly of claim 16 wherein one of said knurling major diameter and said fetter tip diameter being a smaller diameter, wherein said one diameter is nearer said second shaft end.

18. The clevis and self retaining pin assembly of claim 11 wherein said antirotation portion includes knurling on said head of said pin.

19. The clevis and self retaining pin assembly of claim 12 wherein said fetters are proximate to said first end.

20. The clevis and self retaining pin assembly of claim 12 wherein said fetters are proximate to said second end.

21. The clevis and self retaining pin assembly of claim 11 wherein said shaft has two or more shaft diameters, a largest diameter being proximate to said first end and a smallest diameter being proximate to said second end.

22. The clevis and self retaining pin assembly of claim 12 wherein a first set of said fetters is proximate to said first end and a second set of said fetters is proximate to said second end.

23. The clevis and self retaining pin assembly of claim 22 wherein said tip diameter of said second set of fetters is equal to or smaller than said tip diameter of said first set of fetters.

24. A method for installing and securely retaining a clevis pin within the bore of a clevis comprising:

provizzling a clevis and a clevis pin;

said clevis having a bore and two or more clevis arms;

said clevis pin having a generally cylindrical shaft;

said shaft having a shaft diameter;

said clevis pin having a first end and a second end;

said clevis pin having a head, said head having a head diameter greater than said shaft diameter and being located at said first end of said shaft;

said clevis pin having an axial anti-rotation portion defined by said clevis pin, said anti-rotation portion operable to substantially resist rotation of said clevis pin;

said shaft having am axial retention portion defined by said clevis pin, said axial retention portion operable to substantially retain said clevis pin within said clevis bore; and assembling said clevis pin with said clevis by first aligning said clevis pin with said bore and then axially translating said clevis pin until seated so as to engage said axial anti-rotation and axial retention portions of said shaft with said bore.

* * * * *